United States Patent
Nakagawa

[15] 3,645,605
[45] Feb. 29, 1972

[54] ULTRAWIDE-ANGLE PHOTOGRAPHIC OBJECTIVE LENS

[72] Inventor: Jihei Nakagawa, Tokyo, Japan
[73] Assignee: Olympus Optical Co., Ltd., Tokyo, Japan
[22] Filed: July 23, 1970
[21] Appl. No.: 58,451

[30] Foreign Application Priority Data
Aug. 4, 1970 Japan..................................44/61183

[52] U.S. Cl..............................350/214, 350/176, 350/207, 350/215
[51] Int. Cl..........................................G02b 9/62, G02b 9/64
[58] Field of Search...........................350/214, 215

[56] References Cited

UNITED STATES PATENTS

3,506,339   4/1970   Kazamaki..............................350/214
3,512,874   5/1970   Woltche..................................350/214

*Primary Examiner*—John K. Corbin
*Attorney*—Kurt Kelman

[57] ABSTRACT

Ultrawide-angle photographic objective lens having a back focus or rear focal length of about 1.2-1.3 times the focal length of the entire system, an aperture of 1/3.5 and an angle of field of 90°. The objective lens comprises seven lens groups, the foremost first to fourth lens groups of which inclusive constitute the forward lens groups of a negative power adapted to form a virtual image of the object while the fifth to seventh lens groups constitute the rearward lens groups adapted to form a real image from the virtual image. Assuming that the focal length of the entire system is $f$, the focal length of the respective lens group is $f_i$ ($i=1,2,-$) and the radius of curvature of the respective surface of each lens group, the thickness of each lens component or airgap and the refractive index of each lens component are $r_i$, $d_i$ and $n_i$ ($i=1,2,-$) respectively, the objective lens satisfies the following relationships under the condition that the third lens group and the fourth lens group are separated by an airgap:

(1) $$0.5f < |f_2| < f$$

(2) $$\sum_{i=1}^{i=7} di < f$$

(3) $$0.2f < r_6 < f$$
$$0.2f < r_7 < f$$

(4) $$0.2f < d_5 + d_7 < 0.4f$$

while the objective lens satisfies the following relationships when the third and fourth lens groups are cemented with each other:

(1) $$0.5 < |f_2| < f$$

(2) $$\sum_{i=1}^{i=6} di < f$$

(3) $$0.2f < r_6 < f$$

(4) $$0.2f < d_5 + d_6 < 0.4f$$

3 Claims, 6 Drawing Figures

INVENTOR
JIHEI NAKAGAWA
BY Kurt Kelman
AGENT

Patented Feb. 29, 1972  3,645,605

INVENTOR
JIHEI NAKAGAWA

BY Kurt Kelman

AGENT

Patented Feb. 29, 1972

INVENTOR
JIHEI NAKAGAWA

BY Kurt Kelman

AGENT

ULTRAWIDE-ANGLE PHOTOGRAPHIC OBJECTIVE LENS

BACKGROUND OF THE INVENTION

The present invention relates to an ultrawide-angle photographic objective lens having a long back focus, i.e., a long rear focal length and, more particularly, to an ultrawide-angle photographic objective lens which is compact in size and yet has the back focus of about 1.2 to 1.3 times the focal length of the entire system and an aperture of 1/3.5 while the angle of field can be made 90° with various aberrations remarkably corrected over the entire field of view.

An objective lens of the above type has been required particularly for use in a single lens reflex camera and the like. The prior art objective lens has been very complicated in construction and, hence, very expensive.

The present invention aims at avoiding the above-described disadvantages of the prior art photographic objective lens.

SUMMARY OF THE INVENTION

An object of the present invention is to provide a novel and useful ultrawide-angle photographic objective lens having a long back focus which is compact in size and easy to manufacture at a low cost while various aberrations of the objective lens are remarkably corrected.

Another object of the present invention is to provide a novel and useful ultrawide-angle photographic objective lens of the type described above which has an aperture of 1/3.5, an angle of field of 90°, and a rear focal length of about 1.2–1.3 times the focal length of the entire system of the objective lens.

A further object of the present invention is to provide a novel and useful ultrawide-angle photographic objective lens of the type described above which has the total length of about 1–1.3 times the focal length of the entire system while the diameter of the foremost lens group of the optical system can be reduced to about 1.1 times the focal length of the entire system.

The above objects are achieved in accordance with the present invention by the provision of seven lens groups the foremost first lens group of which consists of a positive lens component with its convex surface directed toward the object side, the second lens group consisting of a negative meniscus lens component with its convex surface directed toward the object side, the third lens group consisting of a negative lens component, the fourth lens group consisting of a positive lens component, the fifth lens group consisting of a positive or negative lens component having a low refractive power, a diaphragm being located between the fourth and fifth lens groups, the sixth lens group consisting of a positive meniscus lens component with its convex surface directing to the image side, and the seventh lens group consisting of a positive lens component, the above lens groups being characterized by satisfying the following relationship:

1. the absolute value of the focal length of the second lens group is selected to be greater than half the focal length but smaller than the focal length of the entire system of the objective lens,
2. the axial length of the first to fourth lens groups inclusive is selected to be smaller than the focal length of the entire system,
3. the radius of curvature of the concave surface of the third lens group at the image side and the radius of curvature of the convex surface of the fourth lens group at the object side are selected to be greater than 0.2 times the focal length but smaller than the focal length of the entire system, and
4. the total sum of the thickness of the third lens group and the thickness of the fourth lens group is selected to be greater than 0.2 times the focal length but smaller than 0.4 times the focal length of the entire system.

The third lens group and the fourth lens group may be cemented together or separated from each other by an airgap.

In the objective lens of the present invention, the resultant focal length of forward lens groups, i.e., the first to fourth lens groups inclusive is made negative so that a virtual image of the object is formed thereby, while a real image is formed from the virtual image by means of the rearward lens groups, i.e., the fifth to seventh lens groups inclusive. This construction is called a retrofocus-type wide-angle objective lens. In this construction, the entire system can be made compact by increasing the refractive power of the forward lens groups to the order of −0.8 times the focal length of the entire system while the angle of field can be widened. The nonaxial aberrations generated by increasing the refractive power of the forward lens groups are appropriately compensated for by virtue of the airgaps or air lenses existing between the second, the third and the fourth lens group or the cemented surfaces between the second, the third and the fourth lens groups and the intensive curvature of the rearward surface of the sixth lens group.

The requirements (1) and (2) described above serve to compensate for the various aberrations, enlarge absolute back focus and making the entire system compact. If the absolute value of the focal length of the second lens group is made smaller than 0.5 times the focal length of the entire system it is difficult to appropriately compensate for the aberrations, although the enlargement of the back focus and the reduction in size of the entire system are advantageously achieved. On the other hand, if the absolute value of the focal length of the second lens groups is made greater than the focal length of the entire system, the back focus can not be enlarged while the entire system can not be made compact so that the requirement (2) can not be satisfied thereby resulting in the excessive enlargement of the entire length of the system while the possibility for properly compensating for the aberrations over the entire angle of the field is lost.

The requirement (3) described above relates to the air lens formed between the third lens group and the fourth lens group or the cemented surfaces of the third and the fourth lens group. The air lens, i.e., the surfaces of the third and fourth lens group facing to each other generate remarkable aberrations, respectively, but the aberrations are cancelled under the condition of the requirement (3), while the residual aberrations serve to compensate for coma, etc. Also, the cemented surfaces of the third and the fourth lens group have the same effectiveness as that of the air lens. If the value decreases beyond the lower limit of the requirement (3), the aberrations generated by these surfaces will be too great to be compensated for by other lens elements. On the other hand, if the value exceeds beyond the upper limit, the characteristic technical thought of the present invention can not be achieved which is characterized by the compensation for the aberrations utilizing the intensive curvature of the surfaces of the third and the fourth lens group facing to each other thereby making it impossible to properly compensate for the various nonaxial aberrations over the wide angle of field of the objective lens.

The requirement (4) is necessary for compensating for the curvature of field, the astigmatism and the distortion resulting from the forward lens groups having intensive negative power.

If the value is made too great or too small beyond the limits of the requirement (4), the above aberrations generated by the forward lens groups can not be sufficiently compensated for by the rearward lens groups.

In general, a wide-angle objective lens having a long back focus includes substantially great airgaps between the forward lens groups. In the present invention, however, the above-described requirements (1) to (4) inclusive make it possible to remarkably decrease the airgaps between the forward lens groups while proper compensation for the various aberrations can be achieved thereby permitting an objective lens which is compact in size and has a superior quality to be produced at a low cost.

DETAILED DESCRIPTION OF THE PREFERRED EMBODIMENTS

Figure 1:
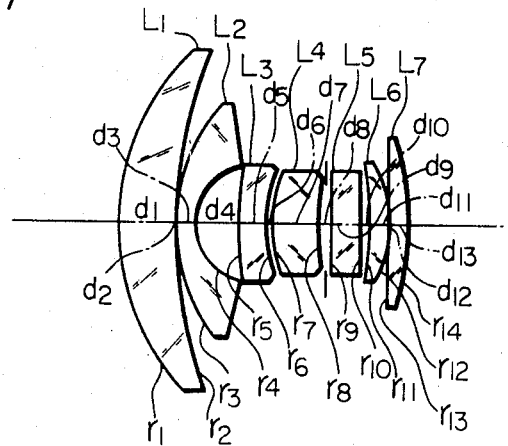
FIG. 1 is a longitudinal sectional view of a first embodiment of the ultrawide-angle photographic objective lens constructed in accordance with the present invention.

Referring to FIG. 1, the first embodiment of the present invention comprises first to seventh lens groups. The first to seventh lens groups consist of lens component $L_1$ to $L_7$, respectively as shown.

The data of the respective lens components $L_1$ to $L_7$ and the arrangement thereof are given in Table 1 below.

TABLE 1

| Focal length | $f=1$ |
| Back focus | $f_B=1.198$ |
| Angle of field | $2W=90°$ |
| Aperture | $F=1/3.5$ |

| | $i$ | $r_i$ | $d_i$ | $n_i$ | $\nu_i$ |
|---|---|---|---|---|---|
| 1st lens component $L_1$ | 1 | 0.7841 | 0.2078 | 1. | |
| | 2 | 1.5939 | 0.0039 | 1.7234 | 38.0 |
| | 3 | 0.5678 | 0.0643 | 1. | |
| 2nd lens component $L_2$ | 4 | 0.2137 | 0.1607 | 1.4875 | 70.0 |
| | 5 | 1.3937 | 0.0964 | 1. | |
| 3rd lens component $L_3$ | 6 | 0.4211 | 0.0161 | 1.8052 | 25.5 t |
| | 7 | 0.5244 | 0.1607 | 1. | |
| 4th lens component $L_4$ | 8 t | 1.1836 | 0.482 | 1.8061 | 40.7 |
| | 9 | 7.6842 | 0.1059 | 1. | |
| 5th lens component $L_5$ | 10 | −7.6842 | 0.0357 | 1.6204 | 60.3 |
| | 11 | −0.8872 | 0.0627 | 1. | |
| 6th lens component $L_6$ | 12 | −0.3130 | 0.0039 | 1.4875 | 70.0 |
| | 13 | −3.9127 | 0.0702 | 1. | |
| 7th lens component | 14 | −0.7442 | | 1.4875 | 70.0 |
| | | | | 1. | | where:

$r_i$ = radius of curvature of the respective surface of each of the lens components ($i = 1,2,−14$, arranged in the order beginning at the object side)

$d_i$ = thickness of lens component or airgap ($i = 1, 2,−13$, arranged in the order beginning at the object side)

$n_i$ = refractive index of lens component or air ($i =1, 2,−15$, arranged in the order beginning at the object side)

$\nu_i$ = Abbe's number of lens component ($i = 1, 2,−14$, arranged in the order beginning at the object side)

The above data are calculated in terms of the focal length $f$ taken as being the unit of 1.

Figure 2:
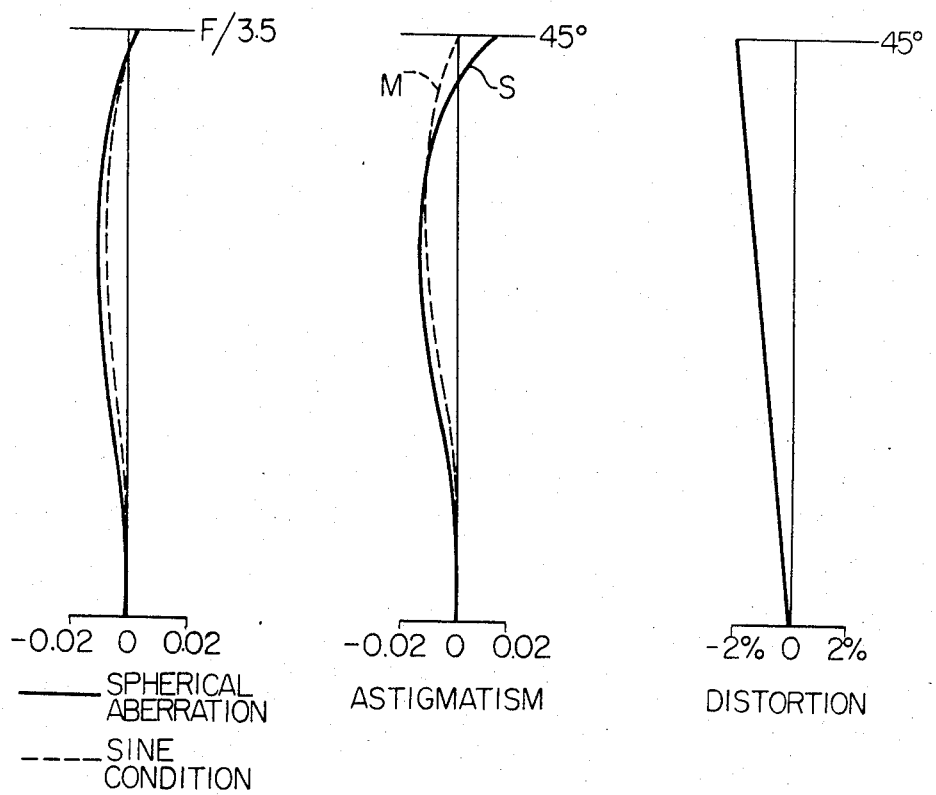
FIG. 2 shows various aberrations of the objective lens of FIG. 1.

The above embodiment satisfies the above described requirements (1) to (4) inclusive and has a superior quality as shown in FIG. 2 showing the various aberrations thereof.

Figure 3:
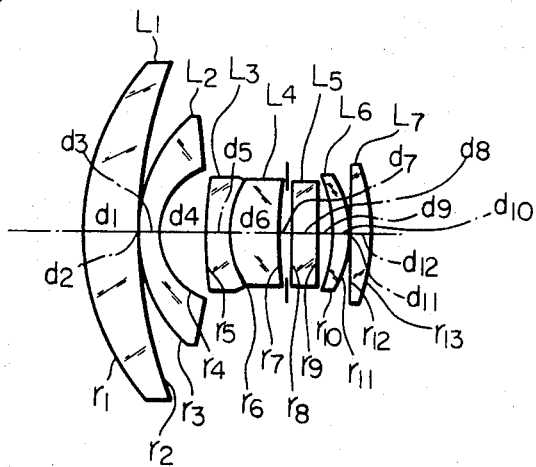
FIG. 3 is a view similar to FIG. 1 but showing a second embodiment of the present invention.

FIG. 3 shows the second embodiment of the present invention. The data of the respective lens components and the arrangement thereof are given in Table 2 below.

TABLE 2

| Focal length | $f=1$ |
| Back focus | $f_B=1.249$ |
| Angle of field | $2=90°$ |
| Aperture | $F=1/3.5$ |

| | $i$ | $r_i$ | $d_i$ | $n_i$ | $\nu_i$ |
|---|---|---|---|---|---|
| 1st lens component $L_1$ | 1 | 0.8768 | 0.2078 | 1. | |
| | 2 | 1.9263 | 0.0039 | 1.7234 | 38.0 |
| | 3 | 0.5832 | 0.0643 | 1. | |
| 2nd lens component $L_2$ | 4 | 0.2163 | 0.1607 | 1.4875 | 70.0 |
| | 5 | 1.5493 | 0.0964 | 1. | |
| 3rd lens component $L_3$ | 6 | 0.3734 | 0.1757 | 1.8052 | 25.5 |
| 4th lens component $L_4$ | 7 | 1.9010 | 0.0482 | 1.6477 | 33.9 |
| | 8 | −3.9873 | 0.1032 | 1. | |
| 5th lens component $L_5$ | 9 | −3.5610 | 0.0390 | 1.6204 | 60.3 |
| | 10 | −0.5238 | 0.0627 | 1. | |
| 6th lens component $L_6$ | 11 | −0.3064 | 0.0039 | 1.4875 | 70.0 |
| | 12 | 4.8594 | 0.0692 | 1. | |
| 7th lens component $L_7$ | 13 | −0.7073 | | 1.4875 | 70.0 |
| | | | | 1. | |

In this embodiment, the third lens component $L_3$ is cemented with the fourth lens component $L_4$.

Figure 4:
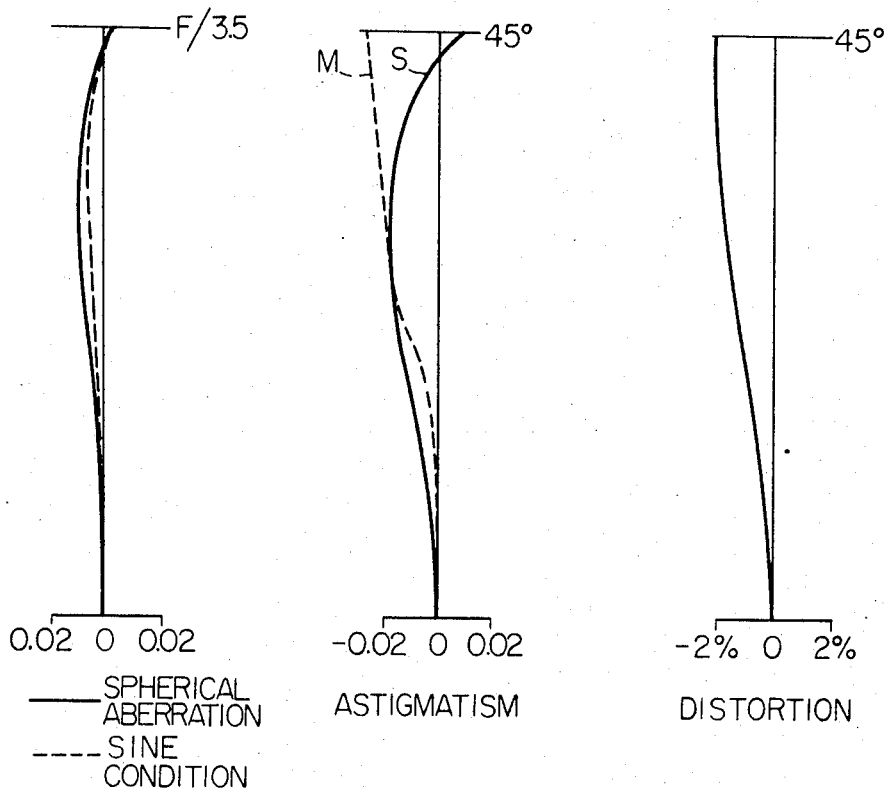
FIG. 4 shows various aberrations of the objective lens of FIG. 3.

As is clear from FIG. 4 showing the various aberrations of the second embodiment, it has a high quality while it satisfies the requirements (1) to (4).

Figure 5:
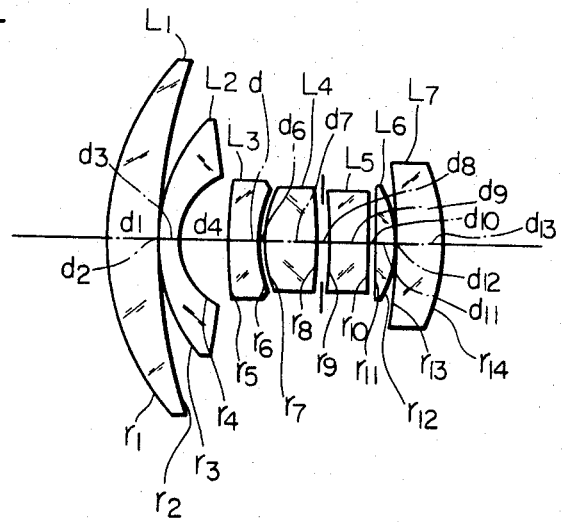
FIG. 5 is a view similar to FIG. 1 but showing a third embodiment of the present invention.

FIG. 5 shows the third embodiment of the present invention. The data of the respective lens components and the arrangement thereof are given in Table 3 below.

TABLE 3

| Focal length | $f=1$ |
| Back focus | $f_B=1.301$ |
| Angle of field | $2w=90°$ |
| Aperture | $F=1/3.5$ |

| | $i$ | $r_i$ | $d_i$ | $n_i$ | $\nu_i$ |
|---|---|---|---|---|---|
| 1st lens component $L_1$ | 1 | 0.8135 | 0.2015 | 1. | |
| | 2 | 2.1624 | 0.0039 | 1.6201 | 49.8 |
| | 3 | 0.5602 | 0.0731 | 1. | |
| 2nd lens component $L_2$ | 4 | 0.2336 | 0.1830 | 1.4875 | 70.0 |
| | 5 | 4.8462 | 0.1099 | 1. | |
| 3rd lens component $L_3$ | 6 | 0.4544 | 0.0182 | 1.8052 | 25.5 |
| | 7 | 0.6476 | 0.1830 | 1. | |
| 4th lens component $L_4$ | 8 | −2.2049 | 0.0549 | 1.8052 | 25.5 |
| | 9 | −0.8916 | 0.1362 | 1. | |
| 5th lens component $L_5$ | 10 | 54.1565 | 0.0244 | 1.8052 | 25.5 |
| | 11 | −2.3078 | 0.0654 | 1. | |
| 6th lens component $L_6$ | 12 | −0.3698 | 0.0039 | 1.4875 | 70.0 |
| | 13 | −3.2107 | 0.1830 | 1. | |
| 7th lens component $L_7$ | 14 | −0.5841 | | 1.5101 | 63.4 |
| | | | | 1. | |

Figure 6:
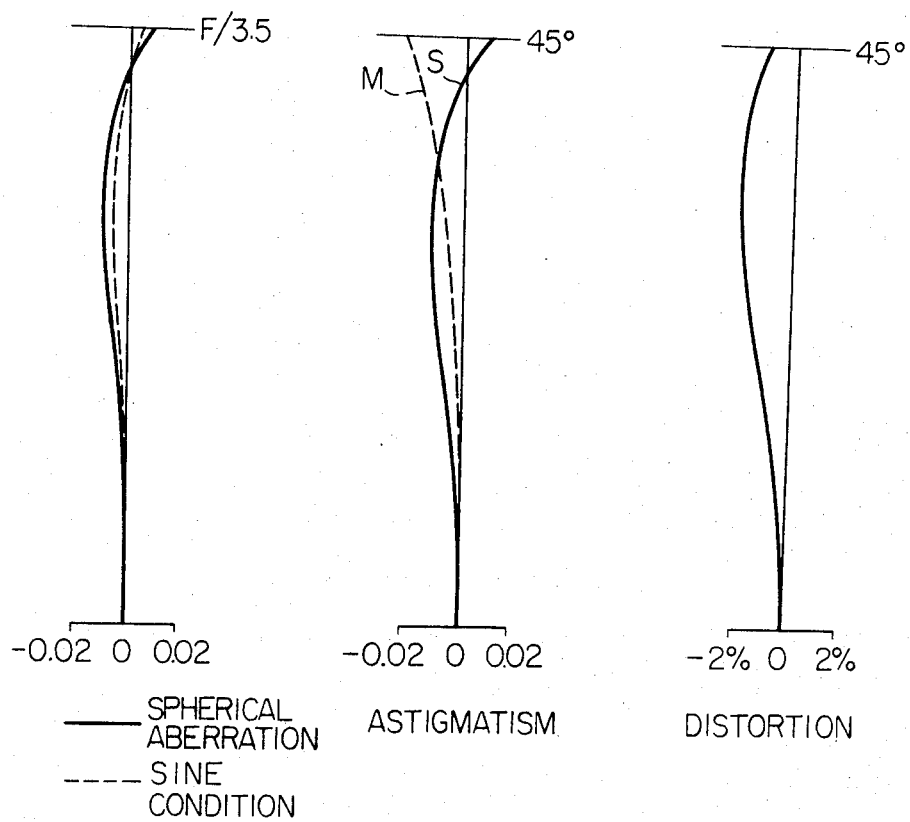
FIG. 6 is a diagram showing various aberrations of the objective lens of FIG. 5.

As is clear from FIG. 6 showing the various aberrations of the third embodiment, it satisfies the requirements (1) to (4) and has a high quality.

The aberrations of the objective lens of the present invention can be corrected more effectively by providing cemented surfaces in any one or more of the lens components.

I claim:

1. Ultrawide-angle photographic objective lens having a long back focus, wherein the improvement comprises the fact that said objective lens comprises seven lens groups of which the first foremost lens group consists of a positive lens component with its convex surface directed toward the object side, the second lens group consisting of a negative meniscus lens component with its convex surface directed toward the object side, the third lens group consisting of a negative lens component, the fourth lens group consisting of a positive lens c component, the third and fourth lens groups being separated by an airgap, the fifth lens group consisting of a lens component having a low refractive power, a diaphragm being located between said fourth and fifth lens groups, the sixth lens group consisting of a positive meniscus lens component with its convex surface directed toward the image side, and the seventh lens group consisting of a positive lens component, said objective lens satisfying the data in the following table as calculated in terms of the focal length of the entire system being made the unit of 1:

Focal length $f=1$
Rear Focal Length $f_R=1.198$
Angle of field $2\text{W}=90°$
Aperture $F=1/3.5$

| | i | ri | di | ni | vi |
|---|---|---|---|---|---|
| 1st lens group $L_1$ | 1 | 0.7841 | 0.2078 | 1. | |
| | 2 | 1.5939 | 0.0039 | 1.7234 | 38.0 |
| 2nd lens group $L_2$ | 3 | 0.5678 | 0.0643 | 1. | |
| | 4 | 0.2137 | 0.1607 | 1.4875 | 70.0 |
| 3rd lens group $L_3$ | 5 | 1.3937 | 0.0964 | 1. | |
| | 6 | 0.4211 | 0.0161 | 1.8052 | 25.5 |
| 4th lens group $L_4$ | 7 | 0.5244 | 0.1607 | 1. | |
| | 8 | 1.1836 | 0.0482 | 1.8061 | 40.7 |
| 5th lens group $L_5$ | 9 | 7.6842 | 0.1059 | 1. | |
| | 10 | -7.6842 | 0.0357 | 1.6204 | 60.3 |
| 6th lens group $L_6$ | 11 | -0.8872 | 0.0627 | 1. | |
| | 12 | -0.3130 | 0.0039 | 1.4875 | 70.0 |
| 7th lens group $L_7$ | 13 | -3.9127 | 0.0702 | 1. | |
| | 14 | -0.7442 | | 1.4875 | 70.0 |
| | | | | 1. | | where:
ri = radius of curvature of the respective surface of each of the lens components ($i = 1,2,-14$, arranged in the order beginning at the object side)
di = thickness of lens component of airgap ($i = 1, 2,-13$, arranged in the order beginning at the object side)
ni = refractive index of lens component or air ($i = 1, 2,-15$, arranged in the order beginning at the object side)
vi = Abbe's number of lens component ($i = 2, 4,-14$, arranged in the order beginning at the object side).

2. Ultrawide-angle photographic objective lens having a long back focus, wherein the improvement comprises the fact that said objective lens comprises seven lens groups of which the first foremost lens group consists of a positive lens component with its convex surface directed toward the object side, the second lens group consisting of a negative meniscus lens component with its convex surface directed toward the object side, the third lens group consisting of a negative lens component, the fourth lens group consisting of a negative lens component, said third and fourth lens groups being cemented with each other, the fifth lens group consisting of a component having a low refractive power a diaphragm being located between said fourth and fifth lens groups, the sixth lens group consisting of a positive meniscus lens component with its convex surface directed toward the image side, and the seventh lens group consisting of a positive lens component, said objective lens satisfying the data in the following table as calculated in terms of the focal length of the entire system being made the unit of 1:

Focal length $f=1$
Rear focal length $f_R=1.249$
Angle of field $2w=90°$
Aperture $F=1/3.5$

| | i | ri | di | ni | vi |
|---|---|---|---|---|---|
| 1st lens group $L_1$ | 1 | 0.8768 | 0.2078 | 1. | |
| | 2 | 1.9263 | 0.0039 | 1.7234 | 38.0 |
| 2nd lens group $L_2$ | 3 | 0.5832 | 0.0643 | 1. | |
| | 4 | 0.2163 | 0.1607 | 1.4875 | 70.0 |
| 3rd lens group $L_3$ | 5 | 1.5493 | 0.0964 | 1. | |
| | 6 | 0.3734 | 0.1757 | 1.8052 | 25.5 |
| 4th lens group $L_4$ | 7 | 1.9010 | 0.0482 | 1.6477 | 33.9 |
| | 8 | -3.9873 | 0.1032 | 1. | |
| 5th lens group $L_5$ | 9 | -3.5610 | 0.0390 | 1.6204 | 60.3 |
| | 10 | -0.5238 | 0.0627 | 1. | |
| 6th lens group $L_6$ | th 11 | -0.3064 | 0.0039 | 1.4875 | 70.0 |
| | 12 | 4.8594 | 0.0692 | 1. | |
| 7th lens group $L_7$ | 13 | -0.7073 | | 1.4875 | 70.0 |
| | | | | 1. | | where:
ri = radius of curvature of the respective surface of each of the lens components ($i =1, 2,-13$, arranged in the order beginning at the object side)
di = thickness of lens component or airgap ($i =1, 2,-12$, arranged in the order beginning at the object side)
ni = refractive index of lens component or air ($i = 1, 2,-14$, arranged in the order beginning at the object side)
vi = Abbe's number of lens component ($i = 2, 4, -13$, arranged in the order beginning at the object side).

3. Ultrawide-angle photographic objective lens having a long back focus, wherein the improvement comprises the fact that said objective lens comprises seven lens groups of which the first foremost lens group consists of a positive lens component with its convex surface directed toward the object side, the second lens group consisting of a negative meniscus lens component with its convex surface directed toward the object side, the third lens group consisting of a negative lens component, the fourth lens group consisting of a positive lens component, the third and fourth lens groups being separated by an airgap, the fifth lens group consisting of a lens component having a low refractive power, a diaphragm being located between said fourth and fifth lens groups, the sixth lens group consisting of a positive meniscus lens component with its convex surface directed toward the image side, and the seventh lens group consisting of a positive lens component, said objective lens satisfying the data in the following table as calculated in terms of the focal length of the entire system being made the unit of 1:

Focal length $f=1$
Rear focal length $f_R=1.301$
Angle of field $2W=90°$
Aperture $F=1/3.5$

| | i | ri | di | ni | vi |
|---|---|---|---|---|---|
| 1st lens group $L_1$ | 1 | 0.8135 | 0.2015 | 1. | |
| | 2 | 2.1624 | 0.0039 | 1.6201 | 49.8 |
| 2nd lens group $L_2$ | 3 | 0.5602 | 0.0731 | 1. | |
| | 4 | 0.2336 | 0.1830 | 1.4875 | 70.0 |
| 3rd lens group $L_3$ | 5 | 4.8462 | 0.1099 | 1. | |
| | 6 | 0.4544 | 0.0182 | 1.8052 | 25.5 |
| 4th lens group $L_4$ | 7 | 0.6476 | 0.1830 | 1. | |
| | 8 | -2.2049 | 0.549 | 1.8052 | 25.5 |
| 5th lens group $L_5$ | 9 | -0.8916 | 0.1362 | 1. | |
| | 10 | 54.1565 | 0.0244 | 1.8052 | 25.5 |
| 6th lens group $L_6$ | 11 | -2.3078 | 0.0654 | 1. | |
| | 12 | -0.3698 | 0.0039 | 1.4875 | 70.0 |
| 7th lens group $L_7$ | 13 | -3.2107 | 0.1830 | 1. | |

| | | | |
|---|---|---|---|
| 14 | −0.5841 | 1.5105 1. | 63.4 | wherein:
$r_i$ = radius of curvature of the respective surface of each of the lens components ($i$ = 1, 2, −14, arranged in the order beginning at the object side)

$d_i$ = thickness of lens component or airgap ($i$ = 1, 2, −13, arranged in the order beginning at the object side)

$n_i$ = refractive index of lens component or air ($i$ = 1, 2, −15, arranged in the order beginning at the object side)

$\nu_i$ = Abbe's number of lens component ($i$ = 2, 4, −14, arranged in the order beginning at the object side).

* * * * *